United States Patent
Athale et al.

(10) Patent No.: US 10,705,691 B2
(45) Date of Patent: Jul. 7, 2020

(54) DYNAMIC USER INTERFACE BLUEPRINT

(71) Applicant: AMERICAN EXPRESS TRAVEL RELATED SERVICES COMPANY, INC., New York, NY (US)

(72) Inventors: Anant Athale, Scottsdale, AZ (US); Srinivas Dasari, Scottsdale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 137 days.

(21) Appl. No.: 15/898,788

(22) Filed: Feb. 19, 2018

(65) Prior Publication Data

US 2019/0258366 A1    Aug. 22, 2019

(51) Int. Cl.
*G06F 3/0484* (2013.01)
*G06F 9/451* (2018.01)
*G06F 16/13* (2019.01)

(52) U.S. Cl.
CPC ............ *G06F 3/0484* (2013.01); *G06F 9/451* (2018.02); *G06F 16/13* (2019.01)

(58) Field of Classification Search
CPC ........ G06F 3/0484; G06F 9/451; G06F 16/13; G06F 3/38
See application file for complete search history.

(56) References Cited

U.S. PATENT DOCUMENTS

| 6,195,651 | B1 | 2/2001 | Handel et al. |
| 2002/0010723 | A1 | 1/2002 | Nielsen |
| 2005/0240589 | A1 | 10/2005 | Altenhofen et al. |
| 2006/0139312 | A1* | 6/2006 | Sinclair, II ............ G06F 3/0481 345/156 |
| 2014/0282062 | A1* | 9/2014 | Kapoor ............... H04L 67/1097 715/745 |
| 2015/0261827 | A1* | 9/2015 | Poulsen ................. G06Q 90/00 707/694 |
| 2017/0191839 | A1* | 7/2017 | Mysen ................. G01C 21/343 |

OTHER PUBLICATIONS

International Report and Written Opinion for PCT Patent Application PCT/US2019/017419 dated May 8, 2019.
Apple Inc. "Preference Pane Programming Guide.", Apple developer Dec. 13, 2012 (Dec. 13, 2012) Retrieved on Apr. 12, 2019 (Apr. 12, 2019).
Middleton, S.E.;et al (2001) "Capturing Knowledge of User Preferences: Ontologies in Recommender Systems." In Proceedings of the 1st international conference on Knowledge capture (pp. 100-107). ACM.

* cited by examiner

*Primary Examiner* — Roland J Casillas
(74) *Attorney, Agent, or Firm* — Thomas | Horstemeyer, LLP

(57) ABSTRACT

A user may interact with a first application. A dynamic user interface consistency system may create a user interface blueprint file which stores explicit and inferred user preferences. The user may open a second application. The second application may refer to the user interface blueprint file to generate a user interface according to the user preferences.

20 Claims, 6 Drawing Sheets

- UI Density
  - <character-count>,<word-count>,<paragraph-count>,<image-count>,<image-size>, <form-input-count>
- UI Settings
  - <window-size>,<window-zoom>,<window-border>,<font-list>,<font-size>
- UI Semantics
  - <control-hierarchy>,<control-name>,<control-order>,<control-size>,<control-position>,<control-color>,<control-alignment>
- UI Layout
  - <scroll-bars>,<layout-hierarchy>, <layout-type>,<layout-weight>,<layout-orientation>,<pagination>

FIG. 2

```
<ui-blueprint>
<user-id>1234</user-id>
<app-type>form<app-type>
<ui-density>
        <form-input-count>3</form-input-count>
        <form-order>vertical</form-order>
        <form-density>low</form-density>
</ui-density>
<ui-layout>
        <scrollbars>
                <horizontal>false</horizontal>
                <vertical>false</vertical>
        </scrollbars>
        <pagination>
                3
        </pagination>
</ui-layout>
<ui-settings>
        <window-size>1024x768</window-size>
        <window-zoom>100%</window-zoom>
        <window-border>false</window-border>
        <font>Helvetica</font>
        <font-size>12</font-size>
</ui-blueprint>
<ui-semantics>
        <control-position>center</control-position>
        <control-alignment>left</control-alignment>
</ui-semantics>

</ui-blueprint>
```

FIG. 4

DYNAMIC USER INTERFACE BLUEPRINT

FIELD

This disclosure generally relates to computer systems, and more particularly, to user interfaces for computer systems.

BACKGROUND

Many software applications utilize different user interfaces and it may be confusing or difficult for a user viewing one application to understand the layout and functions when switching to a different application. Existing methods of using user interface templates in order to standardize user interfaces may be static and limited to using user interface styling such as font, colors, and the types of controls. An improved user interface template is needed that is more dynamic.

SUMMARY

Systems, methods, and articles of manufacture (collectively, the "system") for providing dynamic customized user interfaces are disclosed. The system may perform operations including creating a user interface blueprint file for a user; storing an explicit user preference for a first application in the user interface blueprint file; determining an inferred user preference for the first application; storing the inferred user preference for the first application in the user interface blueprint file; receiving a request from the user to access a second application; reading, in response to the request, the user interface blueprint file; and generating a user interface for the second application based on the explicit user preference and the inferred user preference.

In various embodiments, the user interface blueprint file may comprise at least one of a txt file or an xml file. The user interface blueprint file may comprise a unique user identification for the user. The system may query, in response to the request to access the second application, a database for the user interface blueprint file based on a unique user identification for the user. The first application and the second application may be local applications on a user device. The first application and the second application may be web applications. The user interface blueprint file may comprise a plurality of user preferences including character count, paragraph count, image count, image size, form input count, window size, window zoom, window border, font list, font size, control hierarchy, control name, control order, control size, control position, control color, control alignment, scroll bars, layout hierarchy, layout type, layout weight, layout orientation, and pagination.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 2 illustrates an example of a user interface blueprint template, in accordance with various embodiments.

FIG. 4 illustrates an example of a user interface blueprint file resulting from the preferences stored with respect to the user interfaces described in FIG. 3, in accordance with various embodiments.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems and methods for creating and/or modifying user interfaces are disclosed herein. The systems may dynamically convert the user interface ("UI") of a first application that a user is already familiar with into a portable UI blueprint specification. The UI blueprint may then be used by a second application which may be unfamiliar to the user. The second application may use the UI blueprint to adjust itself to enhance the UI familiarity for the given user. The system may understand the dynamic aspects of a UI including density, settings, hierarchies, semantics, layout and/or learnings based on the usage of the application.

This process improves the functioning of the computer. For example, by providing a user interface which is familiar to the user, the user performs less computer functions and provides less input, because the user is able to quickly find the desired content, which saves on data storage and memory which speeds processing. With the use of this method, the user may be able to quickly and efficiently accomplish their intended task and reduce the computational time, overhead, and resource usage (e.g. memory, cpu, battery) on the user device.

Figure 1:
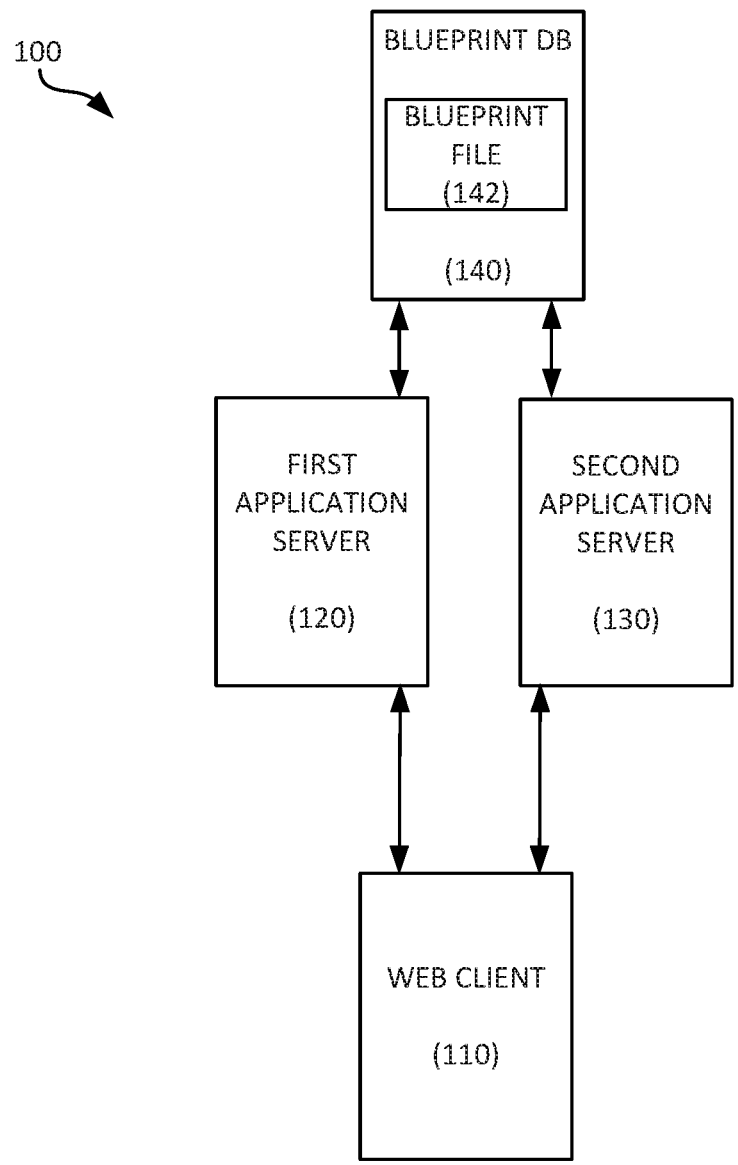
FIG. 1 is a block diagram illustrating various system components of a system for dynamic user interface consistency, in accordance with various embodiments.

Referring to FIG. 1, a system 100 for dynamic user interface consistency is illustrated, according to various embodiments. The system 100 may comprise a web client 110, a first application server 120, a second application server 130, and a user interface blueprint database 140.

The web client 110 may be any device capable of communication over a network, such as a desktop computer or mobile phone. A user may interact with the web client 110 in order to view data and applications housed by the application servers 120, 130. In various embodiments, the user may be a transaction account owner, and the user may wish to view data related to their transaction account which is stored on the application servers.

The application servers 120, 130 may comprise one or more processors or databases capable of providing digital content to the web client 110. The application servers 120, 130 may operate one or more applications which are presented to the web client 110. In various embodiments, the application servers 120, 130 may provide any suitable application or product.

The user interface blueprint database 140 may store a user interface blueprint file 142. The user interface blueprint file 142 may be a text file, such as an Extensible Markup Language (xml) or txt file. The user interface blueprint file 142 may comprise user preferences for viewing content. The user preferences may include both explicit and implicit user preferences. For example, explicit user preferences may be selected by the user, such as a preferred background color or font size. Implicit user preferences may be learned by the application server in response to user behavior, without the user selecting the preferences. For example, the user may historically abandon a registration process if there are more than five data fields. The application servers 120, 130 may then store an implicit user preference in the user interface blueprint file 142 that the user prefers registration processes with less than five data fields.

In various embodiments, a user interface blueprint file may be stored on the web client 110. The web client 110 may run one or more applications which may create and refer to the user interface blueprint file locally in order to generate customized user interfaces on the web client 110.

Referring to FIG. 2, an example of a user interface blueprint template 200 is illustrated according to various embodiments. The user interface blueprint template 200 may comprise preference categories, such as user interface density, user interface settings, user interface semantics, and user interface layout. Each preference category may comprise one or more elements. For example, the user density category may include character count, paragraph count, image count, image size, and form input count. The user interface settings category may include window size, window zoom, window border, font list, and font size. The user interface semantics category may include control hierarchy, control name, control order, control size, control position, control color, and control alignment. The user interface layout category may include scroll bars, layout hierarchy, layout type, layout weight, layout orientation, and pagination.

Figure 3:
FIG. 3 illustrates a single-page registration form and a multi-page registration form for a first application, in accordance with various embodiments.

Referring to FIG. 3, a single-page registration form 310 and a multi-page registration form 320 for a first application are illustrated, according to various embodiments. The registration forms 310, 320 may allow a user to sign up for a product, create an account, etc. Some users may be more likely to complete a registration form when the entire registration form is presented on a single screen. However, some users may be more likely to complete a registration form when the registration form is presented to the user in portions, so that the user is not overwhelmed by a large number of data fields on a single screen.

The application server may present the single-page registration form 310 with all fields on a single screen. The application server may determine that the user either did not start the registration process or started but did not complete the registration process using the single-page registration form 310. For example, by using page level analytics the application server may detect that the user landed on the page, the duration of stay, and any actions performed on the page, such as partially filling out the registration form but navigating away or closing the page. The application server presents the multi-page registration form 320 to the user in the same session or in a different session. The multi-page registration form 320 may present different subsets of the fields to the user in a first screen 322, a second screen 324, and a third screen 326. After the user completes the data fields on the first screen 322, the application server may present the second screen 324 to the user. After the user completes the data fields on the second screen 324, the application server may present the third screen 326 to the user. In response to the user completing the registration using the multi-page registration form 320, the application server may determine that the user prefers multi-page registration forms over single-page registration forms. The application server may store an inferred preference in the user interface blueprint file indicating that the user prefers registration forms to low density, such that they are presented across multiple screens and/or limited to a certain number of fields per screen. The application server may store a preference including an average number of preferred fields. The average number may be a dynamic value that may adapt based on the user's actions across multiple applications, and may correspondingly determine the preferred user interface density value. The user interface density value may be captured both as an indicator of relative density (high, medium, low), as well as an absolute density value (e.g. 3, 4, 5, etc.). These values may be inferred based on the user's historical data.

Referring to FIG. 4, an example of a user interface blueprint file resulting from the preferences stored with respect to the user interfaces described in FIG. 3 is illustrated, according to various embodiments. The user interface blueprint file may include the unique ID for the user, the type of template the user interface blueprint file represents, and the preference categories. The density category indicates that the user prefers low density forms with three inputs arranged vertically. The layout category indicates that the user prefers no scroll bars and three pages. The settings category indicates that the user prefers a 1024×768 pixel size, 100% zoom, no window borders, and size 12. Helvetica font. The semantics category indicates that the user prefers the fields to be centered and left aligned. In various embodiments, the dynamic user interface consistency system may continuously update the user interface blueprint file in real time. For example, in response to each action taken by the user in any application, the dynamic user interface consistency system may update the user interface blueprint file with any additional explicit or inferred preferences.

Figure 5:
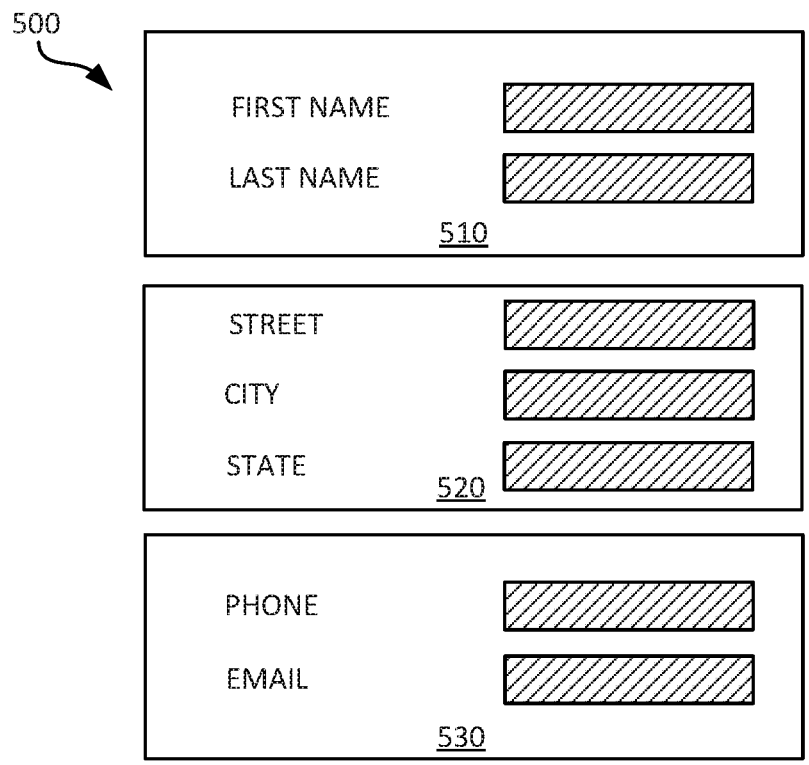
FIG. 5 illustrates an example of a multi-page registration form for a second application, in accordance with various embodiments.

Referring to FIG. 5, an example of a multi-page registration form 500 for a second application is illustrated according to various embodiments. The application server may refer to the user interface blueprint file shown in FIG. 4 in order to generate the multi-page registration form 500. Thus, the multi-page registration form 500 may be displayed in low density with pagination, and three or less fields per screen. The multi-page registration form 500 may comprise displaying a first name field and a last name field on a first screen 510. In response to the user completing the first name field and the last name field, the multi-page registration form 500 may display a street field, a city field, and a state field on a second screen 520. In response to the user completing the street field, the city field, and the state field on the second screen 520, the multi-page registration form 500 may display a phone field and an email field on a third screen 530.

By presenting the multi-page registration form 500 according to the specifications in the user interface blueprint file, the system may improve the effectiveness of the graphical user interface and increase the likelihood that the specific user will complete the multi-page registration form 500.

Thus, the second application may be presented to the user with a similar look and feel as the first application. The user preferences may include visually perceptible elements such as logos, colors, page layout, navigation system, frames, mouse-over effects, or other elements that are consistent between different applications. In various embodiments, the user may be allowed to set a permission flag to enable or disable the adaptation to the dynamic user interface.

Figure 6:
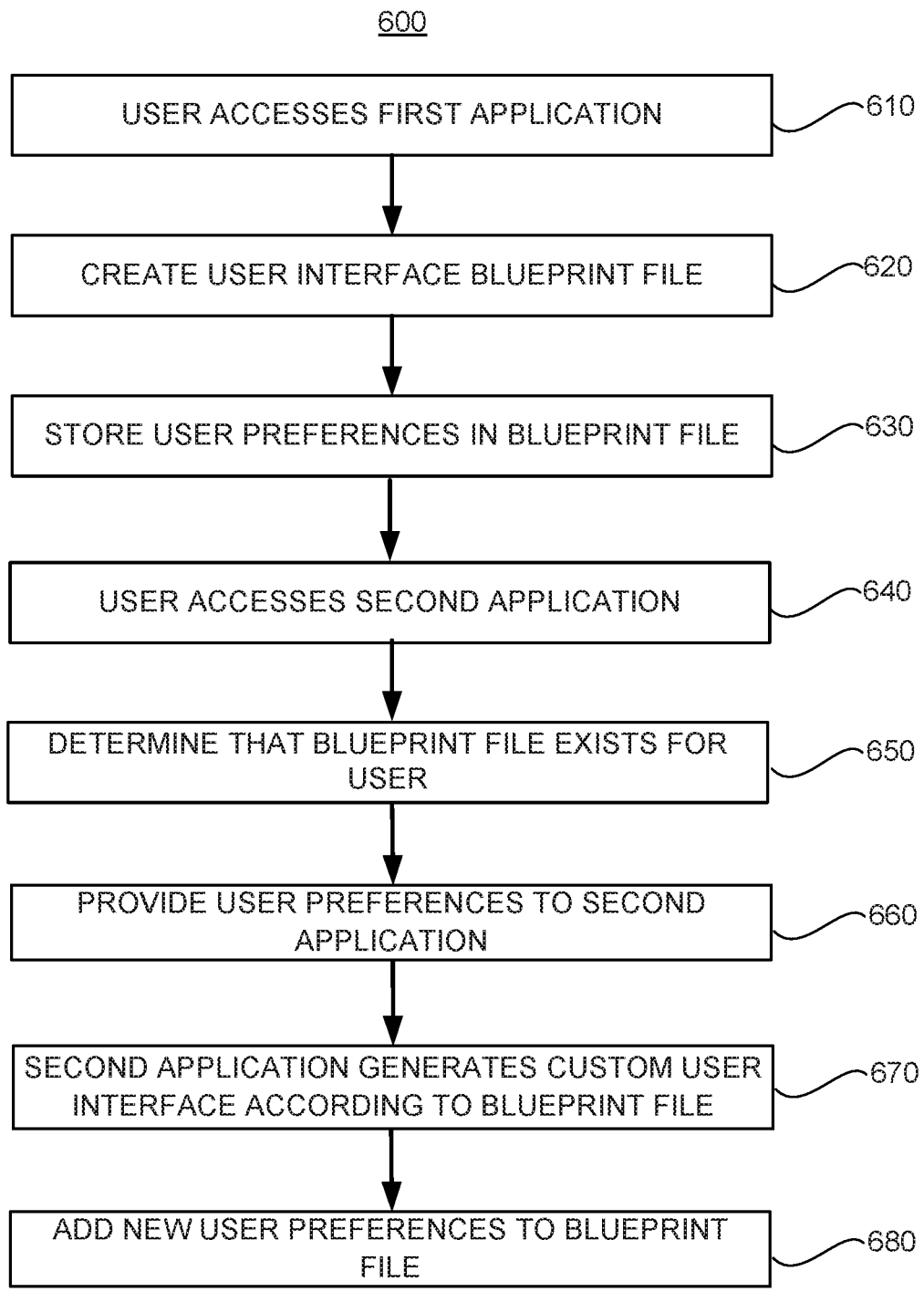
FIG. 6 illustrates a flowchart of a process for providing a customized graphical user interface, in accordance with various embodiments.

Referring to FIG. 6, a flowchart 600 of a process for providing a customized graphical user interface is illustrated, according to various embodiments. A user may access a first application (step 610). In various embodiments, the user may provide identifying information, such as a username and password. A dynamic user interface consistency system may associate the user with a unique user ID. The events from user activity may be captured and stored either locally on the user's device or on the server side if the application is client-server based. The dynamic user interface consistency system may access these event logs to monitor the inputs and process the inputs to generate a blueprint. The dynamic user interface consistency system may create a user interface blueprint file for the user ID (step 620). The user may input an explicit preference to the first application. For example, an application may allow a user to select preferences, such as font, font size, color scheme, etc., and the user may select their preferences. The dynamic user interface consistency system may use a user preference API to obtain user preferences from the first application. The dynamic user interface consistency system may determine an inferred preference. The inferred preferences may include any user interface setting that is not explicitly set by the user, such as determining the user interface text density preference based on user abandonment of high text density user interfaces, or determining the user interface image density preference based on user abandonment of low image density user interfaces. The dynamic consistency system may store the explicit preference and the inferred preference in the user interface blueprint file (step 630).

The user may access a second application (step 640). The dynamic user interface consistency system may determine that a user interface blueprint file exists for the user ID associated with the user (step 650). For example, the dynamic user interface consistency system may query a database for a user interface blueprint file for the user ID. The second application may be programmed to query the dynamic user interface consistency system for the user interface blueprint file in response to the user accessing the second application. The query may be executed locally if the dynamic user interface consistency system is hosted locally on the user device, or the query may be executed on the server side if the system is server based. The dynamic user interface consistency system may provide the user preferences to the second application (step 660). The second application may refer to the user interface blueprint file to generate a dynamic user interface according to the user preferences (step 670). The system may receive additional user preferences in response to user interactions with the second application, and the system may add the additional user preferences to the user interface blueprint file (step 680).

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA system developed by AMAZON.

Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information.

For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface.

Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, JAVA Virtual Machine running on LINUX or WINDOWS).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Tatty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The disclosure and claims do not describe only a particular outcome of providing a dynamic customized user interface, but the disclosure and claims include specific rules for implementing the outcome of providing a dynamic customized user interface, and that render information into a specific format that is then used and applied to create the desired results of providing a dynamic customized user interface, as set forth in *McRO, Inc. v. Bandai Namco Games America Inc.* (Fed. Cir. case number 15-1080, Sep. 13, 2016). In other words, the outcome of providing a dynamic customized user interface, can be performed by many different types of rules and combinations of rules, and this disclosure includes various embodiments with specific rules. While the absence of complete preemption may not guarantee that a claim is eligible, the disclosure does not sufficiently preempt the field of providing a dynamic customized user interface at all. The disclosure acts to narrow, confine, and otherwise tie down the disclosure so as not to cover the general abstract idea of providing a dynamic customized user interface. Significantly, other systems and methods exist of providing a dynamic customized user interface, so it would be inappropriate to assert that the claimed invention preempts the field or monopolizes the basic tools of providing a dynamic customized user interface. In other words, the disclosure will not prevent others from providing a dynamic customized user interface, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

What is claimed is:

1. A method, comprising:
creating, by a computer-based system, a user interface blueprint file for a user;
storing, by the computer-based system, an explicit user selection of a first user interface characteristic in a first application in the user interface blueprint file;
determining, by the computer-based system, an inferred user selection of a second user interface characteristic in the first application based at least in part on the user performing an action with a first user interface having the second user interface characteristic and the user refraining from performing the action with a second user interface not having the second user interface characteristic;
storing, by the computer-based system, the inferred user selection of the second user interface characteristic in the user interface blueprint file;
receiving, by the computer-based system, a request from the user to access a second application;
reading, by the computer-based system and in response to the request, the user interface blueprint file; and
generating, by the computer-based system, a third user interface for the second application having the first user interface characteristic and the second user interface characteristic based at least in part on the explicit user selection and the inferred user selection.

2. The method of claim 1, wherein the user interface blueprint file comprises at least one of a text file or an extensible markup language file.

3. The method of claim 1, wherein the user interface blueprint file comprises a unique user identification for the user.

4. The method of claim 1, further comprising querying, by the computer-based system and in response to the request to access the second application, a database for the user interface blueprint file based at least in part on a unique user identification for the user.

5. The method of claim 1, wherein the first application and the second application are local applications on a user device.

6. The method of claim 1, wherein the first application and the second application are web applications.

7. The method of claim 1, wherein the user interface blueprint file comprises a plurality of user interface characteristics including two or more of: character count, paragraph count, image count, image size, form input count, window size, window zoom, window border, font list, font size, control hierarchy, control name, control order, control size, control position, control color, control alignment, scroll bars, layout hierarchy, layout type, layout weight, layout orientation, or pagination.

8. A system comprising:
a processor,
a tangible, non-transitory memory configured to communicate with the processor, the tangible, non-transitory memory having instructions stored thereon that, in response to execution by the processor, cause the processor to perform operations comprising:
creating, by the processor, a user interface blueprint file for a user;
storing, by the processor, an explicit user selection of a first user interface characteristic in a first application in the user interface blueprint file;
determining, by the processor, an inferred user selection of a second user interface characteristic in the first application based at least in part on the user performing an action with a first user interface having the second user interface characteristic and the user refraining from performing the action with a second user interface not having the second user interface characteristic;

storing, by the processor, the inferred user selection of the second user interface characteristic in the user interface blueprint file;

receiving, by the processor, a request from the user to access a second application;

reading, by the processor and in response to the request, the user interface blueprint file; and generating, by the processor, a third user interface for the second application having the first user interface characteristic and the second user interface characteristic based at least in part on the explicit user selection and the inferred user selection.

9. The system of claim 8, wherein the user interface blueprint file comprises at least one of a text file or an extensible markup language file.

10. The system of claim 8, wherein the user interface blueprint file comprises a unique user identification for the user.

11. The system of claim 8, the operations further comprising querying, by the processor and in response to the request to access the second application, a database for the user interface blueprint file based at least in part on a unique user identification for the user.

12. The system of claim 8, wherein the first application and the second application are local applications on a user device.

13. The system of claim 8, wherein the first application and the second application are web applications.

14. The system of claim 8, wherein the user interface blueprint file comprises a plurality of user interface characteristics including two or more of: character count, paragraph count, image count, image size, form input count, window size, window zoom, window border, font list, font size, control hierarchy, control name, control order, control size, control position, control color, control alignment, scroll bars, layout hierarchy, layout type, layout weight, layout orientation, or pagination.

15. An article of manufacture including a non-transitory, tangible computer readable storage medium having instructions stored thereon that, in response to execution by a computer-based system, cause the computer-based system to perform operations comprising:

creating, by the computer-based system, a user interface blueprint file for a user;

storing, by the computer-based system, an explicit user selection of a first user interface characteristic in a first application in the user interface blueprint file;

determining, by the computer-based system, an inferred user selection of a second user interface characteristic in the first application based at least in part on the user performing an action with a first user interface having the second user interface characteristic and the user refraining from performing the action with a second user interface not having the second user interface characteristic;

storing, by the computer-based system, the inferred user selection of the second user interface characteristic in the user interface blueprint file;

receiving, by the computer-based system, a request from the user to access a second application;

reading, by the computer-based system and in response to the request, the user interface blueprint file; and generating, by the computer-based system, a third user interface for the second application having the first user interface characteristic and the second user interface characteristic based at least in part on the explicit user selection and the inferred user selection.

16. The article of manufacture of claim 15, wherein the user interface blueprint file comprises at least one of a text file or an extensible markup language file.

17. The article of manufacture of claim 15, wherein the user interface blueprint file comprises a unique user identification for the user.

18. The article of manufacture of claim 15, further comprising querying, by the computer-based system and in response to the request to access the second application, a database for the user interface blueprint file based at least in part on a unique user identification for the user.

19. The article of manufacture of claim 15, wherein the first application and the second application are local applications on a user device.

20. The article of manufacture of claim 15, wherein the first application and the second application are web applications.

* * * * *